(12) United States Patent
Um et al.

(10) Patent No.: US 11,008,010 B2
(45) Date of Patent: May 18, 2021

(54) APPARATUS FOR CONTROLLING LANE CHANGE OF VEHICLE, SYSTEM HAVING THE SAME AND METHOD THEREOF

(71) Applicants: HYUNDAI MOTOR COMPANY, Seoul (KR); KIA MOTORS CORPORATION, Seoul (KR)

(72) Inventors: Doo Jin Um, Seoul (KR); Hoi Won Kim, Gwacheon-si (KR); Beom Jun Kim, Seoul (KR); Dae Young Kim, Gwangmyeong-si (KR); Chan Il Park, Chungcheongbuk-do (KR); Jin Su Jeong, Suwon-si (KR); Dong Eon Oh, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 214 days.

(21) Appl. No.: 16/206,170

(22) Filed: Nov. 30, 2018

(65) Prior Publication Data

US 2019/0315362 A1 Oct. 17, 2019

Related U.S. Application Data

(60) Provisional application No. 62/655,831, filed on Apr. 11, 2018.

(30) Foreign Application Priority Data

Oct. 15, 2018 (KR) .................. 10-2018-0122831

(51) Int. Cl.
*B60W 30/08* (2012.01)
*G08G 1/16* (2006.01)
(Continued)

(52) U.S. Cl.
CPC .. *B60W 30/18163* (2013.01); *B60W 30/0956* (2013.01); *G08G 1/167* (2013.01)

(58) Field of Classification Search
CPC ............... B60W 30/18; B60W 30/015; B60W 30/18163; B60W 30/0956; B60W 10/10;
(Continued)

(56) References Cited

U.S. PATENT DOCUMENTS

| 5,521,579 A | 5/1996 | Bernhard |
| 6,055,467 A | 4/2000 | Mehring et al. |

(Continued)

FOREIGN PATENT DOCUMENTS

| DE | 198 21 122 A1 | 6/1999 |
| DE | 101 14 187 A1 | 9/2002 |

(Continued)

OTHER PUBLICATIONS

European Search Report dated Oct. 2, 2019 from the corresponding European Application No. 19163402.1, 10 pages.

(Continued)

*Primary Examiner* — Tan Q Nguyen
(74) *Attorney, Agent, or Firm* — Brinks Gilson & Lione

(57) ABSTRACT

An apparatus for controlling a lane change of a vehicle may include: a processor determining whether a condition of interrupting a lane change procedure occurs, during controlling the lane change. In particular, when the condition of interrupting the lane change procedure is satisfied, the processor determines whether to interrupt the lane change procedure or whether to return the vehicle to an original lane to control the vehicle depending on a result of the determinations. The apparatus further includes a storage to store the result determined by the processor.

18 Claims, 8 Drawing Sheets

(51) Int. Cl.
*B60W 30/18* (2012.01)
*B60W 30/095* (2012.01)

(58) Field of Classification Search
CPC . G08G 1/16; G08G 1/167; B60Q 1/34; B62D 15/0255; B62D 15/02
See application file for complete search history.

(56) References Cited

U.S. PATENT DOCUMENTS

| | | |
|---|---|---|
| 6,473,678 B1 | 10/2002 | Satoh et al. |
| 6,842,687 B2 | 1/2005 | Winner et al. |
| 7,363,140 B2 | 4/2008 | Ewerhart et al. |
| 7,821,421 B2 | 10/2010 | Tamir et al. |
| 8,073,595 B2 | 12/2011 | Tabata et al. |
| 8,521,352 B1 | 8/2013 | Ferguson et al. |
| 8,798,841 B1 | 8/2014 | Nickolaou et al. |
| 8,874,301 B1 | 10/2014 | Rao et al. |
| 9,315,178 B1 | 4/2016 | Ferguson et al. |
| 9,527,441 B2 | 12/2016 | Matsumura |
| 9,874,871 B1 | 1/2018 | Zhu et al. |
| 10,183,668 B2 | 1/2019 | Takae |
| 10,449,856 B2 | 10/2019 | Kojima |
| 10,558,213 B2 | 2/2020 | Sato et al. |
| 10,627,813 B2 | 4/2020 | Tsuji et al. |
| 10,663,971 B2 | 5/2020 | Sugawara et al. |
| 10,676,084 B2 | 6/2020 | Fujii |
| 2003/0163239 A1 | 8/2003 | Winner et al. |
| 2005/0137782 A1 | 6/2005 | Shinada |
| 2005/0228588 A1 | 10/2005 | Braeuchle et al. |
| 2005/0256630 A1 | 11/2005 | Nishira et al. |
| 2006/0009910 A1* | 1/2006 | Ewerhart ............ B60W 30/16 701/301 |
| 2007/0043505 A1 | 2/2007 | Leicht |
| 2007/0255474 A1 | 11/2007 | Hayakawa et al. |
| 2008/0172153 A1 | 7/2008 | Ozaki et al. |
| 2009/0005933 A1 | 1/2009 | Tabata et al. |
| 2009/0088925 A1 | 4/2009 | Sugawara et al. |
| 2009/0132125 A1 | 5/2009 | Yonezawa et al. |
| 2009/0171533 A1 | 7/2009 | Kataoka |
| 2009/0194350 A1 | 8/2009 | Rattapon et al. |
| 2009/0299573 A1 | 12/2009 | Thrun et al. |
| 2009/0319113 A1 | 12/2009 | Lee |
| 2010/0010733 A1 | 1/2010 | Krumm |
| 2010/0042282 A1* | 2/2010 | Taguchi ............ B60W 30/12 701/25 |
| 2010/0289632 A1 | 11/2010 | Seder et al. |
| 2011/0241862 A1 | 10/2011 | Debouk et al. |
| 2011/0251758 A1 | 10/2011 | Kataoka |
| 2011/0293145 A1 | 12/2011 | Nogami et al. |
| 2012/0166032 A1 | 6/2012 | Lee et al. |
| 2012/0296522 A1* | 11/2012 | Otuka ............ B60W 30/12 701/41 |
| 2013/0063595 A1 | 3/2013 | Niem |
| 2013/0066525 A1 | 3/2013 | Tomik et al. |
| 2013/0226406 A1 | 8/2013 | Ueda et al. |
| 2014/0074356 A1* | 3/2014 | Bone ............ G08G 1/167 701/41 |
| 2015/0006012 A1 | 1/2015 | Kammel et al. |
| 2015/0019063 A1 | 1/2015 | Lu et al. |
| 2015/0094899 A1 | 4/2015 | Hackenberg et al. |
| 2015/0148985 A1 | 5/2015 | Jo |
| 2015/0166062 A1 | 6/2015 | Johnson et al. |
| 2015/0204687 A1 | 7/2015 | Yoon et al. |
| 2015/0353082 A1 | 12/2015 | Lee et al. |
| 2015/0355641 A1 | 12/2015 | Choi et al. |
| 2015/0360721 A1 | 12/2015 | Matsuno et al. |
| 2016/0001781 A1 | 1/2016 | Fung et al. |
| 2016/0107682 A1 | 4/2016 | Tan et al. |
| 2016/0107687 A1 | 4/2016 | Yamaoka |
| 2016/0187879 A1 | 6/2016 | Mere et al. |
| 2016/0225261 A1* | 8/2016 | Matsumoto ......... B60W 10/184 |
| 2016/0250968 A1 | 9/2016 | Shirakata et al. |
| 2016/0272204 A1 | 9/2016 | Takahashi et al. |
| 2016/0288707 A1 | 10/2016 | Matsumura |
| 2016/0297431 A1 | 10/2016 | Eigel et al. |
| 2016/0339913 A1 | 11/2016 | Yamashita et al. |
| 2016/0368492 A1 | 12/2016 | Al-Stouhi |
| 2017/0003683 A1 | 1/2017 | Sato et al. |
| 2017/0061799 A1 | 3/2017 | Fujii et al. |
| 2017/0108865 A1 | 4/2017 | Rohde et al. |
| 2017/0124882 A1 | 5/2017 | Wang |
| 2017/0171375 A1 | 6/2017 | Kamata |
| 2017/0197637 A1 | 7/2017 | Yamada et al. |
| 2017/0203763 A1 | 7/2017 | Yamada et al. |
| 2017/0203764 A1 | 7/2017 | Fujiki et al. |
| 2017/0240172 A1* | 8/2017 | Nishiguchi ...... B60W 30/18163 |
| 2017/0240186 A1 | 8/2017 | Hatano |
| 2017/0243491 A1 | 8/2017 | Fujii et al. |
| 2017/0291603 A1 | 10/2017 | Nakamura |
| 2017/0313313 A1 | 11/2017 | Asakura |
| 2017/0315556 A1* | 11/2017 | Mimura ............. G08G 1/167 |
| 2017/0334460 A1 | 11/2017 | Arakawa et al. |
| 2017/0341652 A1* | 11/2017 | Sugawara ............ B60W 30/08 |
| 2017/0349212 A1 | 12/2017 | Oshida et al. |
| 2017/0368936 A1 | 12/2017 | Kojima |
| 2018/0029604 A1 | 2/2018 | Niino et al. |
| 2018/0033309 A1 | 2/2018 | Norwood |
| 2018/0043906 A1 | 2/2018 | Huang |
| 2018/0046185 A1 | 2/2018 | Sato et al. |
| 2018/0050659 A1 | 2/2018 | Coburn |
| 2018/0074497 A1 | 3/2018 | Tsuji et al. |
| 2018/0088574 A1 | 3/2018 | Latotzki et al. |
| 2018/0091085 A1 | 3/2018 | Tamagaki et al. |
| 2018/0111628 A1 | 4/2018 | Tamagaki et al. |
| 2018/0154939 A1* | 6/2018 | Aoki ................ B60W 50/10 |
| 2018/0157038 A1 | 6/2018 | Kabe |
| 2018/0170370 A1 | 6/2018 | Kataoka |
| 2018/0173225 A1 | 6/2018 | Kim et al. |
| 2018/0178713 A1 | 6/2018 | Fujii |
| 2018/0178714 A1 | 6/2018 | Fujii |
| 2018/0178715 A1 | 6/2018 | Fujii |
| 2018/0178716 A1 | 6/2018 | Fujii |
| 2018/0186376 A1 | 7/2018 | Lee et al. |
| 2018/0194280 A1 | 7/2018 | Shibata et al. |
| 2018/0197414 A1 | 7/2018 | Oooka |
| 2018/0209801 A1 | 7/2018 | Stentz et al. |
| 2018/0215387 A1 | 8/2018 | Takae |
| 2018/0222422 A1 | 8/2018 | Takae |
| 2018/0222423 A1 | 8/2018 | Takae et al. |
| 2018/0237030 A1 | 8/2018 | Jones et al. |
| 2018/0239352 A1 | 8/2018 | Wang et al. |
| 2018/0251155 A1 | 9/2018 | Chan et al. |
| 2018/0281788 A1 | 10/2018 | Uchida |
| 2018/0290666 A1 | 10/2018 | Ichikawa et al. |
| 2018/0292820 A1 | 10/2018 | Markberger |
| 2018/0297638 A1 | 10/2018 | Fujii |
| 2018/0297639 A1 | 10/2018 | Fujii |
| 2018/0297640 A1 | 10/2018 | Fujii |
| 2018/0339708 A1 | 11/2018 | Geller |
| 2018/0345959 A1 | 12/2018 | Fujii |
| 2018/0345960 A1 | 12/2018 | Fujii |
| 2018/0345964 A1 | 12/2018 | Fujii et al. |
| 2018/0346027 A1* | 12/2018 | Fujii ................ B60W 30/09 |
| 2018/0348758 A1 | 12/2018 | Nakamura et al. |
| 2018/0350242 A1 | 12/2018 | Fujii |
| 2018/0354519 A1 | 12/2018 | Miyata |
| 2018/0362013 A1 | 12/2018 | Ungermann |
| 2018/0370542 A1 | 12/2018 | Braunagel et al. |
| 2018/0370544 A1 | 12/2018 | Kitagawa |
| 2018/0373250 A1 | 12/2018 | Nakamura et al. |
| 2019/0005823 A1 | 1/2019 | Fujiki et al. |
| 2019/0026918 A1 | 1/2019 | Gomezcaballero et al. |
| 2019/0061766 A1 | 2/2019 | Nishiguchi |
| 2019/0071099 A1 | 3/2019 | Nishiguchi |
| 2019/0135290 A1* | 5/2019 | Marden ............ G06K 9/00805 |
| 2019/0155279 A1 | 5/2019 | Tayama |
| 2019/0161117 A1 | 5/2019 | Suzuki |
| 2019/0185005 A1* | 6/2019 | Fukuda ............ G08G 1/167 |
| 2019/0235504 A1 | 8/2019 | Carter et al. |
| 2019/0241198 A1 | 8/2019 | Mori et al. |
| 2019/0256064 A1 | 8/2019 | Hecker et al. |
| 2019/0263411 A1 | 8/2019 | Saikyo et al. |
| 2019/0265712 A1 | 8/2019 | Satzoda et al. |

(56) References Cited

U.S. PATENT DOCUMENTS

| | | |
|---|---|---|
| 2019/0279507 A1 | 9/2019 | Oshisaka et al. |
| 2019/0283757 A1 | 9/2019 | Honda et al. |
| 2019/0291728 A1 | 9/2019 | Shalev-Shwartz et al. |
| 2019/0302768 A1 | 10/2019 | Zhang et al. |
| 2019/0315362 A1 | 10/2019 | Um et al. |
| 2019/0317494 A1 | 10/2019 | Lee et al. |
| 2019/0325758 A1 | 10/2019 | Yoshii et al. |
| 2019/0359202 A1 | 11/2019 | Zhu et al. |
| 2019/0391580 A1 | 12/2019 | Di Cairano et al. |
| 2020/0001714 A1 | 1/2020 | Kojima |
| 2020/0073396 A1 | 3/2020 | Shimizu |
| 2020/0172123 A1 | 6/2020 | Kubota et al. |
| 2020/0180638 A1 | 6/2020 | Kanoh |
| 2020/0269747 A1 | 8/2020 | Kusayanagi et al. |
| 2020/0269880 A1 | 8/2020 | Tokita |
| 2020/0301431 A1 | 9/2020 | Matsubara et al. |
| 2020/0307634 A1 | 10/2020 | Yashiro |
| 2020/0312155 A1 | 10/2020 | Kelkar et al. |
| 2020/0391593 A1 | 12/2020 | Lee et al. |

FOREIGN PATENT DOCUMENTS

| | | |
|---|---|---|
| DE | 10 2004 005815 B3 | 6/2005 |
| DE | 10 2004 048 468 A1 | 4/2006 |
| DE | 10 2007 005 245 A1 | 11/2007 |
| DE | 10 2011 016 7 | 11/2011 |
| DE | 10 2011 016 7 | 10/2012 |
| DE | 10 2012 001405 A1 | 11/2012 |
| DE | 10 2011 109618 A1 | 2/2013 |
| DE | 10 2012 008090 A1 | 10/2013 |
| DE | 10 2014 225 680 A1 | 6/2016 |
| DE | 10 2015 205131 A1 | 9/2016 |
| DE | 10 2016 202946 A1 | 9/2016 |
| DE | 10 2015 206969 A1 | 10/2016 |
| DE | 10 2015 209476 A1 | 11/2016 |
| DE | 10 2015 219231 A1 | 4/2017 |
| DE | 10 2015 224244 A1 | 6/2017 |
| DE | 10 2016 007187 A1 | 6/2017 |
| DE | 10 2016 215565 A1 | 2/2018 |
| DE | 10 2016 216134 A1 | 3/2018 |
| EP | 1074904 A1 | 2/2001 |
| EP | 1607264 A1 | 12/2005 |
| EP | 2116984 A1 | 11/2009 |
| EP | 2657921 A1 | 10/2013 |
| EP | 2978648 A1 | 2/2016 |
| EP | 3075618 A2 | 10/2016 |
| EP | 3239960 A1 | 11/2017 |
| EP | 3 264 211 A1 | 1/2018 |
| EP | 3284646 A1 | 2/2018 |
| EP | 3075618 A3 | 5/2018 |
| JP | 2000-198458 A | 7/2000 |
| JP | 2003-025868 A | 1/2003 |
| JP | 2015-138330 A | 7/2015 |
| JP | 2016-000602 A | 1/2016 |
| JP | 2016-151815 A | 8/2016 |
| JP | 2016-196285 A | 11/2016 |
| JP | 2019-043169 A | 3/2019 |
| KR | 10-0578573 B1 | 5/2006 |
| KR | 10-1779823 B1 | 10/2017 |
| KR | 10-2018-0070401 A | 6/2018 |
| WO | 2010-088869 A1 | 8/2010 |
| WO | 2012-131405 A1 | 10/2012 |
| WO | 2014-154771 A1 | 10/2014 |
| WO | 2017-018133 A1 | 2/2017 |
| WO | 2017 064941 A1 | 4/2017 |
| WO | 2017-168013 A1 | 10/2017 |
| WO | 2017 168013 A1 | 10/2017 |
| WO | 2018-033389 A1 | 2/2018 |
| WO | 2017-017793 A1 | 6/2018 |

OTHER PUBLICATIONS

European Search Report dated Oct. 2, 2019 from the corresponding European Application No. 19162795.9, 8 pages.
European Search Report dated Oct. 14, 2019 from the corresponding European Application No. 19161253.0, 11 pages.
European Search Report dated Oct. 18, 2019 from the corresponding European Application No. 19167268.2, 8 pages.
European Search Report dated Oct. 23, 2019 from the corresponding European Application No. 19167266.6, 9 pages.
Office Action dated Oct. 16, 2019 from U.S. Appl. 16/204,362, 32 pages.
European Search Report dated Jul. 1, 2019 from the corresponding European Application No. 18210398.6, 9 pages.
European Search Report dated Jul. 3, 2019 from the corresponding European Application No. 18210063.6, 10 pages.
European Search Report dated Jul. 18, 2019 from the corresponding European Application No. 18210400.0, 5 pages.
European Search Report dated Jul. 22, 2019 from the corresponding European Application No. 18210403.4, 8 pages.
European Search Report dated Jul. 22, 2019 from the corresponding European Application No. 18210401.8, 8 pages.
European Search Report dated Jul. 25, 2019 from the corresponding European Application No. 18209168.6, 9 pages.
European Search Report dated Jul. 25, 2019 from the corresponding European Application No. 19156387.3, 8 pages.
European Search Report dated Aug. 2, 2019 from the corresponding European Application No. 19167271.6, 8 pages.
European Search Report dated Aug. 22, 2019 from the corresponding European Application No. 19167263.3, 8 pages.
European Search Report dated Aug. 30, 2019 from the corresponding European Application No. 19167269.0, 9 pages.
European Search Report dated Aug. 30, 2019 from the corresponding European Application No. 19167267.4, 8 pages.
European Search Report dated Mar. 27, 2020 from the corresponding European Application No. 19167264.1, 8 pages.
European Search Report dated Apr. 21, 2020 from the corresponding European Application No. 19167270.8, 8 pages.
U.S. Office Action dated Feb. 4, 2020 from the corresponding U.S. Appl. No. 16/296,890, 19 pp.
U.S. Office Action dated Mar. 25, 2020 from the corresponding U.S. Appl. No. 16/204,362, 27 pp.
U.S. Office Action dated Apr. 24, 2020 from the corresponding U.S. Appl. No. 16/203,884, 25 pp.
European Search Report dated May 11, 2020 from the corresponding European Application No. 19167265.8, 9 pages.
Office Action for U.S. Appl. 16/204,400 dated Jun. 1, 2020, 44 pages.
Notice of Allowance for U.S. Appl. 16/204,362 dated Jul. 9, 2020, 21 pages.
Office Action dated Aug. 12, 2020 from the corresponding U.S. Appl. No. 16/192,279, 60 pages.
Notice of Allowance dated Sep. 4, 2020 from the corresponding U.S. Appl. No. 16/203,884, 15 pages.
Office Action dated Dec. 10, 2020 from the corresponding U.S. Appl. No. 16/269,140, 31 pages.
Office Action dated Dec. 14, 2020 from the corresponding U.S. Appl. No. 16/378,203, 49 pages.
Office Action dated Jan. 25, 2021 from the corresponding U.S. Appl. No. 16/192,279, 38 pages.
Notice of Allowance dated Jan. 25, 2021 from the corresponding U.S. Appl. No. 16/372,937, 31 pages.
Office Action dated Jan. 27, 2021 from the corresponding U.S. Appl. No. 16/299,547, 29 pages.
Office Action dated Feb. 11, 2021 from the corresponding U.S. Appl. No. 16/372,896, 26 pages.
Office Action dated Feb. 11, 2021 from the corresponding U.S. Appl. No. 16/376,661, 24 pages.
Office Action dated Feb. 17, 2021 from the corresponding U.S. Appl. No. 16/204,324, 30 pages.
Office Action dated Feb. 17, 2021 from the corresponding U.S. Appl. No. 16/376,576, 56 pages.
Office Action dated Mar. 17, 2021 in U.S. Appl. No. 16/378,181, 14 pages.

(56) References Cited

OTHER PUBLICATIONS

Notice of Allowance dated Mar. 23, 2021, in U.S. Appl. No. 16/269,140, 9 pages.

* cited by examiner

… (1)

APPARATUS FOR CONTROLLING LANE CHANGE OF VEHICLE, SYSTEM HAVING THE SAME AND METHOD THEREOF

CROSS-REFERENCE TO RELATED APPLICATIONS

This application claims priority to and the benefit of Korean Patent Application No. 10-2018-0122831, filed on Oct. 15, 2018, which claims priority to and the benefit of U.S. Application No. 62/655,831, filed on Apr. 11, 2018, the entirety of each of which are incorporated herein by reference.

FIELD

The present disclosure relates to an apparatus for controlling a lane change of a vehicle, a system having the same and method thereof.

BACKGROUND

The statements in this section merely provide background information related to the present disclosure and may not constitute prior art.

Nowadays, with the rapid development of the IT technology, the interest in the intelligent automobile converged with a vision system is increasing. In particular, the advanced safety automobile technology, which reduces the risk of traffic accidents and assists safety driving, such as a lane departure warning system, a lane keeping assist system, a collision warning system, and a lane change controlling system is based on the intelligent automobile technology, and a great deal of manpower and resources are invested in various research and technology development. In particular, a lane change controlling system capable of automatically changing a lane on which a vehicle is driving may automatically control the vehicle to perform the lane change, when a driver manipulates a turn signal to change the lane.

The lane change controlling system may determine whether the speed, location, or the like of a nearby vehicle is suitable to perform the lane change, may set a control path for the lane change, and may control steering torque depending on the control path, and thus may perform the lane change.

However, we have discovered that when a lane change procedure needs to be interrupted before a lane change operation, a conventional lane change controlling system may interrupt a lane change procedure, however, this lane change control system does not take into account the situation where the lane change procedure needs to be interrupted after the lane change operation is started.

SUMMARY

An aspect of the present disclosure provides an apparatus for controlling a lane change of a vehicle, a system having the same and method thereof that perform lane change control and lane change cancellation control for minimizing the sense of difference of a user, thereby improving the usability of the lane change assist function.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling lane change of a vehicle may include: a processor configured to determine whether a condition of interrupting a lane change procedure occurs, during controlling the lane change, and configured to determined, when the condition of interrupting the lane change procedure occurs, whether to interrupt the lane change procedure or whether to return the vehicle to an original lane to control the vehicle depending on the result; and a storage configured to store the outputs determined by the processor.

According to an exemplary form, the processor may be configured to calculate a lane change path, when receiving a lane change request and to determine whether the vehicle leans toward a target lane in a lane change direction.

According to another form, the processor may be configured to calculate a difference value between the lane change path and an actual vehicle behavior path based on an error in the lane change.

According to another exemplary form, the processor may be configured to determine that the vehicle does not lean, when the error for the lane change is less than a predetermined reference value and to generate a returning area to return the vehicle to the original lane based on a distance from a center of the vehicle to a lane mark of a current lane on which the vehicle is travelling, and a value corresponding to a half of an overall width of the vehicle.

According to another form, the processor may be configured to determine that the vehicle leans toward the target lane, when the error in the lane change is equal to or greater than the predetermined reference value.

According to other form, the processor may be configured to reduce the calculated returning area when it is determined that the vehicle leans toward the target lane.

According to another form, the processor may be configured to reduce the calculated returning area corresponding to the error in the lane change.

According to another exemplary form, the processor may be configured to determine whether the condition that the lane change procedure is interrupted occurs.

In one form, the processor may be configured to determine that the condition that the lane change procedure is interrupted occurs, when at least one or more of a case that a dangerous situation is sensed, a case that hand-off state of a user of the vehicle is sensed, a case that a lane change procedure cancellation request is generated by a user, a case that a lane change operation is not started within a predetermined time after the user requests a lane change, a case that a lane change function is turned off or overridden by the user, a case that an operation of approaching a lane and lateral movement for completing the lane change operation are not continuous while a lane is not recognized or during the lane change procedure are satisfied.

In another form, the processor may be configured to determine whether an event to return the vehicle to the original lane occurs, when the condition that the lane change procedure is interrupted occurs.

According to another form, the processor may be configured to determine that the event to return the vehicle to the original lane occurs, when at least one or more of a case that a lane change function is turned off or overridden by a user, a case that an operation of approaching a lane and lateral movement for completing a lane change operation are not continuous while a lane is not recognized or during the lane change procedure are satisfied.

According to other form, the processor may be configured to determine whether the vehicle is placed within a returning area corresponding to an area to return the vehicle to the original lane return, when the event to return to the original lane occurs.

According to another form, the processor may be configured to calculate a path for returning to the original lane and to provide a notification that the lane change procedure is interrupted, when the vehicle is placed within the returning area for the original lane return.

According to another form, the processor may be configured to keep a lane change path continuously, when the vehicle is not placed within the returning area corresponding to the original lane return.

According to another form, the processor may be configured to determine whether a lane is not recognized, when the event to return to the original lane does not occur.

According to another form, the processor may be configured to generate a path for keeping a current lane and to provide a notification that the lane change procedure is interrupted, when the lane is recognized.

According to another form, the processor may be configured to provide a notification that the lane change procedure is interrupted, without generating a lane change path, when the lane is not recognized.

According to other form, the processor may be configured to sense a dangerous situation, when a relative longitudinal distance of a nearby vehicle is less than a predetermined safe reference with respect to the vehicle and to determine a hand-off state of the user when a steering torque and a steering torque change rate are equal to or less than predetermined corresponding reference values, respectively.

In other form, a vehicle system may include a lane change controlling apparatus configured to: determine whether a condition of interrupting a lane change procedure occurs, during controlling the lane change, and determined whether to interrupt the lane change procedure or whether to return the vehicle to an original lane to control the vehicle, when the condition of interrupting the lane change procedure occurs. The vehicle system further includes a warning device outputting a notification when the lane change procedure is interrupted.

According to another aspect of the present disclosure, a method for controlling lane change of a vehicle may include: determining, by a processor, whether a condition of interrupting a lane change procedure occurs, during controlling the lane change; when the condition of interrupting the lane change procedure occurs, determining, by the processor, whether to interrupt the lane change procedure or whether to return the vehicle to an original lane to control the vehicle; outputting, by a warning device, a notification when the lane change procedure is interrupted, and controlling the vehicle depending on the determination result.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
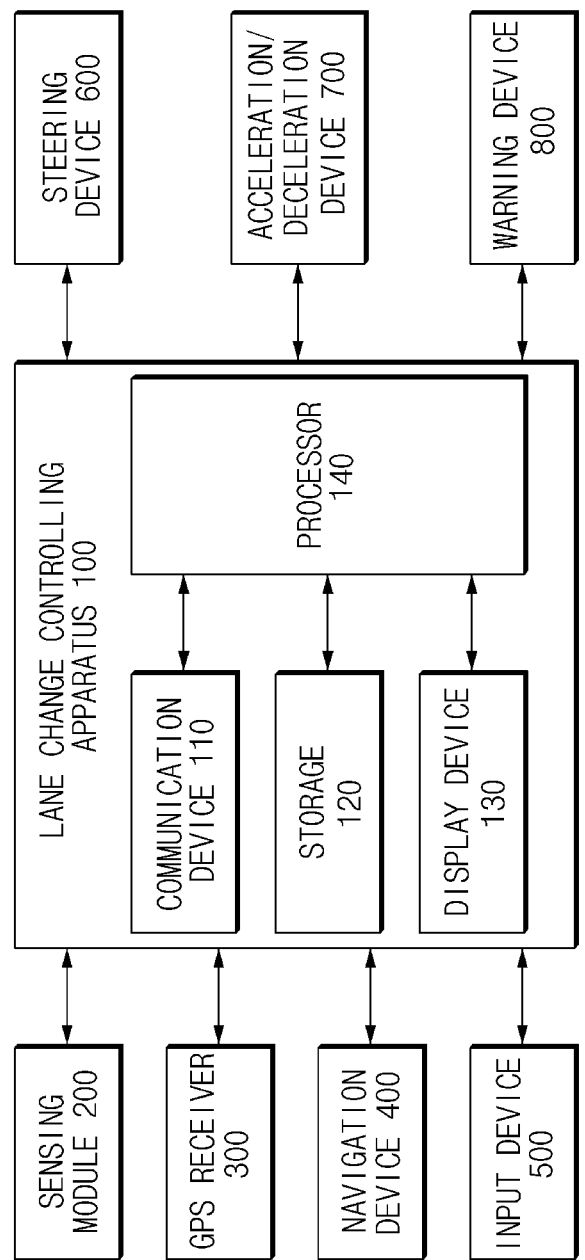
FIG. 1 is a block diagram of a configuration of a vehicle system including an apparatus for controlling a lane change of a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, a detailed description of well-known features or functions will be ruled out in order not to unnecessarily obscure the gist of the present disclosure.

In describing elements of exemplary forms of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific tams used herein are to be interpreted as is customary in the art to which this present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

In the present disclosure, a lane change assist function may be performed through a procedure of 1) lighting a turn signal by a driver, 2) lateral movement to the lane boundary in the direction of the movement lane, 3) a lane change operation (lane crossing), 4) a lane keeping function, and 5) automatically turning off a turn signal (by a system).

The lane change operation is defined as an operation in which the front tire of a vehicle starts to touch the inside of the lane close to the movement lane and then the vehicle completely crosses the lane. Furthermore, the lane change procedure needs to be interrupted, when a condition that the lane change procedure is interrupted occurs before a lane change operation is started; the present disclosure discloses a function of determining the condition that the lane change procedure is interrupted and then interrupting the lane change procedure, providing a notification that the lane change procedure is interrupted, determining original lane return control, performing original lane return control, and the like.

Below, various forms of the present disclosure will be described in detail with reference to FIGS. 1 to 8.

FIG. 1 is a block diagram of a vehicle system including an apparatus for controlling a lane change of a vehicle, according to an exemplary form of the present disclosure.

The vehicle system according to an form of the present disclosure may include: a lane change controlling apparatus 100, a sensing module 200, a Global Positioning System (GPS) receiver 300, a navigation device 400, an input device 500, a steering device 600, an acceleration/deceleration device 700, and a warning device 800. The vehicle system of FIG. 1 may be mounted in a vehicle.

The lane change controlling apparatus 100 may determine whether it is possible to change a lane of a vehicle, whether to interrupt a lane change procedure, whether to return the vehicle to an original lane after the lane change is cancelled, whether to provide a notification that a lane change procedure is interrupted, or the like, based on GPS information received from the GPS receiver 300, map information received from the navigation device 400, and the peripheral sensing information sensed by the sensing module 200.

The lane change controlling apparatus 100 may be electrically connected to the sensing module 200, the GPS receiver 300, the navigation device 400, the input device 500, the steering device 600, the acceleration/deceleration device 700, the warning device 800, and the like, may control the sensing module 200, the GPS receiver 300, the navigation device 400, the input device 500, the steering device 600, the acceleration/deceleration device 700, and the warning device 800, and may perform various data processing and calculation.

To this end, the lane change controlling apparatus 100 of a vehicle may include a communication device 110, storage 120, a display device 130, and a processor 140.

The communication device 110 may be a hardware device implemented with various electronic circuits for transmitting and receiving signals via a wireless or wired connection; in the present disclosure, the communication device 110 may communicate with devices in a vehicle over CAN communication, LIN communication, or the like and may communicate with devices outside the vehicle over wireless communication.

The storage 120 may store information received from the sensing module 200, the GPS receiver 300, the navigation device 400, and the like, and the determination result of whether it is possible to change a lane of a vehicle, whether to interrupt a lane change procedure, whether to return to an original lane after the lane change is cancelled, whether to provide a notification that a lane change procedure is interrupted, or the like, which is determined by the processor 140, and an area corresponding to original lane return. The storage 120 may include at least one type of a storage medium among a flash memory type of a memory, a hard disk type of a memory, a micro type of a memory, and a card type (e.g., a Secure Digital (SD) card or an eXtream Digital (XD) Card) of a memory, a Random Access Memory (RAM) type of a memory, a Static RAM (SRAM) type of a memory, a Read-Only Memory (ROM) type of a memory, a Programmable ROM (PROM) type of a memory, an Electrically Erasable PROM (EEPROM) type of a memory, an Magnetic RAM (MRAM) type of a memory, a magnetic disk type of a memory, and an optical disc type of a memory.

The display device 130 may display a determination result of whether it is possible to change a lane of a vehicle, whether to interrupt a lane change procedure, whether to return to an original lane after the lane change is cancelled, or the like and a notification of a dangerous situation, a lane change path, a path for returning to an original lane, or the like. The display device 130 may be implemented with a Head Up Display (HUD), a cluster, an Audio Video Navigation (AVN), or the like. In addition, the display device 130 may directly receive a color input from a user through a User Setting Menu (USM) menu of a cluster. Furthermore, the display device 130 may include at least one of a Liquid Crystal Display (LCD), a Thin Film Transistor-LCD (TFT LCD), a Light Emitting Diode (LED) display, an Organic LED (OLED) display, an Active Matrix OLED (AMOLED) display, a flexible display, a bended display, and a 3D display. Some of the displays may be implemented with a transparent display that is transparent or optically transparent to view the outside. Moreover, the display device 130 may be provided as a touchscreen including a touch panel and may be used as an input device in addition to an output device.

The processor 140 may be electrically connected to the communication device 110, the storage 120, and the display device 130, may electrically control each of the components, may be an electrical circuit that executes the instructions of the software, and may perform various data processing and calculation described below. For example, the processor 140 may be an electronic control unit (ECU) or a sub-controller, which is mounted in the vehicle.

The processor 140 may determine whether it is possible to change a lane of a vehicle, whether to interrupt a lane change procedure, whether to return to an original lane after the lane change is cancelled, whether to provide a notification that a lane change procedure is interrupted, or the like based on surrounding situation information; and the surrounding situation information may include at least one or more of GPS information received from the GPS receiver 300, map information received from the navigation device 400, and surrounding information sensed by the sensing module 200.

The processor 140 may generate a lane change path and/or a path for returning to an original lane that is based on GPS reception information or the navigation device 400.

The processor 140 may generate a lane change path and may determine whether a vehicle leans toward a target lane in a lane change direction, when receiving a lane change request (e.g., when a turn signal is turned on by a user).

The processor 140 may calculate a difference value between the lane change path and an actual vehicle behavior path based on an error in the lane change; the processor 140 may determine that a vehicle does not lean toward the target lane, when the error for the lane change is less than a predetermined reference value; and the processor 140 may generate a returning area corresponding to an area to return the vehicle to the original lane by using a distance from the center of the vehicle to a lane mark of a current lane on which the vehicle is travelling, and a value that is a half of the overall width of the vehicle. At this time, the returning area may be an area that is referenced when a vehicle returns to the original lane (e.g., the previous lane on which the vehicle previously travelled before the lane change to the target lane), may correspond to a determination area for determining whether the vehicle returns to the original lane, and may be changed depending on the leaning of the vehicle.

The processor 140 may determine that a vehicle leans toward the target lane, when the error in the lane change is equal to or greater than a predetermined reference value; the processor 140 may reduce and generate the returning area corresponding to original lane return, when a vehicle leans. At this time, the processor 140 may reduce the returning area corresponding to original lane return by the error in the lane change and may generate the reduced area corresponding to original lane return.

The processor 140 may determine whether a condition (situation) that the lane change procedure is interrupted occurs, before the lane change operation is started; the processor 140 may interrupt the lane change procedure, when the condition that the lane change procedure is interrupted occurs.

The condition that the lane change procedure is interrupted may include 1) when a dangerous situation is sensed, 2) when hand-off is sensed, 3) in the case of cancellation (the case where a user turns off a turn signal) by a user, 4) when a lane change operation is not started within a predetermined time (e.g., 5 seconds) after the user requests a lane change (e.g., after the user manipulates a turn signal), 5) when a lane change function is turned off or overridden by the user, 6) when the limit of a system is reached (the case where a lane is not recognized, or the like), 7) when an operation of approaching a lane and lateral movement for completing the lane change operation are not continuous during the lane change procedure, or the like.

For the purpose of 1) determining whether the dangerous situation is sensed, the processor 140 may determine whether a relative longitudinal distance (with respect to the vehicle) of a nearby vehicle is less than a predetermined safe distance $S_{critical}$. At this time, the safe distance is represented by Equation 1.

$$S_{critical} = (V_{rear} - V_{ACSF})*tB + (V_{rear} - V_{ACSF})^2/(2*a) + V_{ACSF}*t_G \quad \text{[Equation 1]}$$

$V_{rear}$ may indicate the lower value among the actual speed of an approaching vehicle or 130 km/h; $V_{ACSF}$ may indicate the actual speed of an ACSF vehicle; 'a' may indicate the deceleration of the approaching vehicle; $t_G$ may indicate a value obtained by subtracting the speed reference of the ACSF vehicle from a margin interval of the vehicles after the deceleration of the approaching vehicle; 'tB' may indicate a time period before the approaching vehicle starts to decelerate after the lane change operation is started.

The processor 140 may determine that the dangerous situation is sensed, when the relative longitudinal distance (with respect to the vehicle) of a nearby vehicle is less than the predetermined safe distance $S_{critical}$.

Moreover, for the purpose of 2) determining the hand-off of a driver, the processor 140 may determine that the hand-off is sensed, when the absolute value of each of torque and a torque change rate is not greater than a reference value.

$$|Tq| <= Tq_{\_HandsOff\_Ref} \&\& |Tq\_Delta| =< Tq\_Delta_{\_HandsOff\_Ref} \quad \text{[Equation 2]}$$

|Tq| may indicate the absolute value of the steering torque; |Tq_Delta| may indicate the absolute value of the steering torque change rate; $Tq_{\_HandsOff\_Ref}$ may indicate an arbitrary reference value.

For the purpose of 3) determining whether the user turns off a turn signal, the processor 140 may determine whether the switch of the turn signal is turned off. That is, in a state where the switch of the turn signal is turned on to request the lane change, the processor 140 may interrupt the lane change procedure, when the user turns off the switch of the turn signal again.

In addition, for the purpose of 4) determining whether the lane change operation is delayed, the processor 140 may determine that the lane change operation is delayed and then may interrupt the lane change procedure, when the lane change operation is not started within a predetermined time (e.g., 5 seconds) after the user manipulates the turn signal.

For the purpose of 5) determining whether the lane change function is turned off or overridden by the user, the processor 140 may determine whether a lane change function button is turned off by the user or whether the absolute value of the torque is not less than an arbitrary reference value, to determine whether the lane change function is overridden. The processor 140 may interrupt the lane change procedure, when the lane change function is turned off or overridden by the user.

For the purpose of 6) determining whether the limit of a system is reached, the processor 140 may determine a situation that a lane is not recognized, or the like. The situation that a lane is not recognized is the case where the reliability of both lanes being the output of a camera is low; in this case, the processor 140 may interrupt the lane change procedure.

For the purpose of 7) determining whether a lane change is abnormal, the processor 140 may determine that the current location in a lane is maintained during a specific time, during the lane change. That is, when the operation of approaching a lane and the lateral movement for completing the lane change operation are not continuous during the lane change procedure, the processor 140 may determine that the lateral movement of the lane change is abnormal due to disturbance (transverse gradient, or the like), when a lateral distance DisToTire to a lane in the lane changing direction may be similarly maintained to be equal to or greater than a specific time $T_{LatHoldLC}$ TBD and a lateral error increases as compared with a lane change path. As such, the processor 140 may interrupt the lane change procedure, when it is determined that the lane change is abnormal.

The processor 140 may determine the current location of the vehicle or whether the lane change operation is started and then may determine whether to return to an original lane, 1) when the dangerous situation is sensed, 2) when the hand-off is sensed, 3) in the case of the cancellation (the case where a user turns off a turn signal) by a user, or 4) when the lane change operation is not started within a predetermined time (e.g., 5 seconds) after the user manipulates the turn signal.

The processor 140 may immediately transfer the control of the lateral movement to the user regardless of the current location of the vehicle or whether the lane change operation is started, may not generate a path or may generate a lane-keeping control path, and may respond to the situations, 5) when the lane change function is turned off or overridden by the user, 6) when the limit of a system is reached (the case where a lane is not recognized, or the like), or 7) when the operation of approaching a lane and the lateral movement for completing the lane change operation are not continuous during the lane change procedure.

That is, the processor 140 may determine whether the steering of the user intervenes, when a situation corresponds to Nos. 5, 6, or 7; the processor 140 may not generate a path, when the steering of the user intervenes; the processor 140 may provide a notification that a lane-keeping path is generated and the lane change is interrupted, when the steering of the user does not intervene.

Furthermore, the processor 140 may determine whether the vehicle is present within the area corresponding to original lane return, 1) when a dangerous situation is sensed, 2) when the hand-off is sensed, 3) in the case of the cancellation (the case where a user turns off a turn signal) by a driver, or 4) when the lane change operation is not started within 5 seconds after the driver manipulates the turn signal; the processor 140 may generate a path for returning to an original lane and may provide a notification that the lane change is interrupted, when the vehicle is present within the area corresponding to original lane return.

Also, since the probability that the vehicle will cross the lane is great based on the behavior of the vehicle, the processor 140 may maintain the lane change procedure, when the vehicle is not present within the returning area corresponding to original lane return. In addition, the processor 140 may maintain the lane change procedure, when the vehicle is not present within the returning area corresponding to original lane return; the processor 140 may notify the user of the dangerous situation, when the dangerous situation is sensed.

As such, the lane change controlling apparatus 100 according to an exemplary form of the present disclosure may change a lane, may interrupt the lane change procedure, may keep a lane, may not generate a path, may change a path, and may provide a notification that the lane change procedure is interrupted, when a condition that the lane change procedure is interrupted occurs, thereby reducing or minimizing the sense of difference such that the user fully recognizes the situations.

Furthermore, the present disclosure may change a returning area corresponding to original lane return that is the determination area for determining the path change, depending on the leaning of the vehicle, thereby inhibiting or preventing lane departure, or the like when the vehicle returns to a lane.

The sensing module 200 may be configured to obtain information about external objects (e.g., nearby vehicles, pedestrians, motor cycles, bicycles, median strips, the number of lanes of driving roads) that are driving in the same lane, which the vehicle is driving, and a neighboring lane to sense the surrounding situation. The information about the external objects may include the location, speed, type, direction of movement, or the like of each of the external objects. To this end, the sensing module 200 may include at least one or more of a camera, radar, LiDAR, an ultrasonic sensor, an acceleration sensor, a yaw rate sensor, a torque measurement sensor and/or a wheel speed sensor. Moreover, at least one or more sensors may be mounted on the front, rear, left and right sides of the vehicle.

The GPS receiver 300 receives a GPS signal from a GPS satellite and transmits the GPS signal to the lane change controlling apparatus 100. As such, the lane change controlling apparatus 100 may determine the current location (e.g., whether the vehicle is present within an area for returning to an original lane, or the like) of the vehicle by using the GPS signal.

The navigation device 400 provides the lane change controlling apparatus 100 with map information according to the location and destination of the vehicle. At this time, the lane change controlling apparatus 100 may operate in conjunction with the navigation device 400 to generate lane change path information and information about a path for returning to an original lane; the lane change controlling apparatus 100 may receive and use the lane change path information and information about the path for returning to an original lane from the navigation device 400.

The input device 500 may be configured to receive a lane change command from a user; the present disclosure may include a direction indication lever, a switch, a button, or the like, which is capable of receiving a user input, for the lane change.

The steering device 600 may be configured to control the steering angle of the vehicle and may include a steering wheel, an actuator operating in conjunction with the steering wheel, and a controller for controlling the actuator.

The acceleration/deceleration device 700 may be configured to control the speed of the vehicle and may include a throttle, a brake, an actuator operating in conjunction with the throttle and the brake, and a controller that controls the actuator.

The warning device 800 may perform a warning, such as a lane change notification, a notification that the lane change procedure is interrupted, a notification of returning to an original lane, a dangerous situation notification, or the like. The warning device 800 may include a configuration for performing the visual, auditory, and tactile warning.

As such, the present disclosure may perform a lane change control, when receiving a lane change request from the user; the present disclosure may determine a condition that a lane change procedure is interrupted, a condition of returning to an original lane, or the like to rapidly perform the lane change, the lane change cancellation, and the original lane return, depending on situations, thereby enhancing the user's convenience and improving the usability of a lane change assist function.

Figure 2:
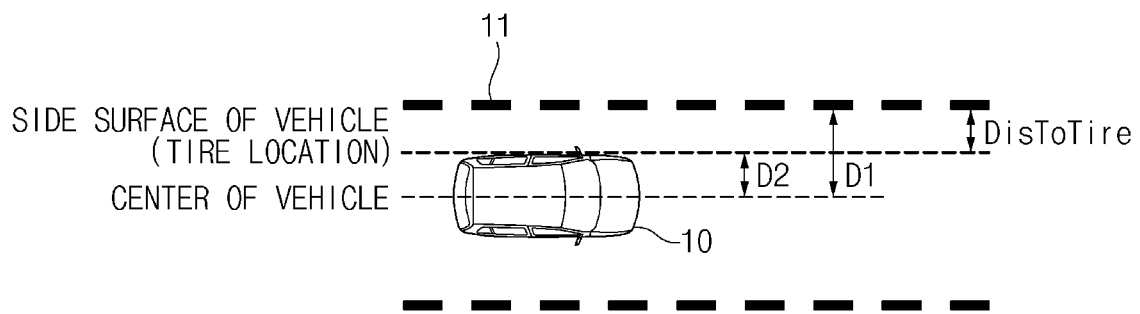
FIG. 2 is a view for describing an operation of determining whether a lane change operation of a vehicle is started.
Figure 3:
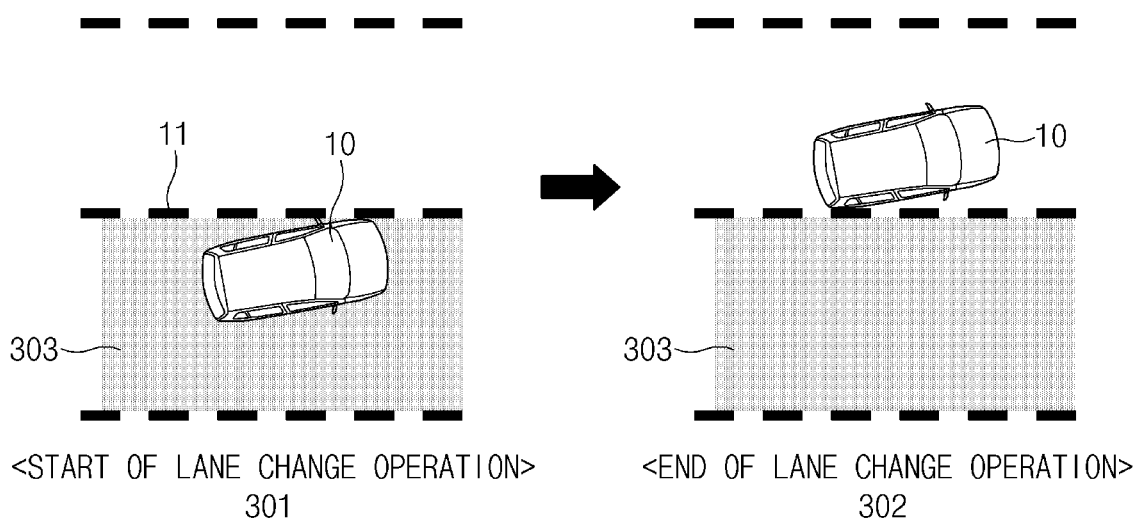
FIG. 3 is a view for describing an exemplary operation at a point in time when a lane change operation of a vehicle is started, and at a point in time when a lane change operation of a vehicle ends.

FIG. 2 is a view for describing an operation of determining whether a lane change operation of a vehicle is started, according to an exemplary form of the present disclosure. FIG. 3 is a view for describing an exemplary operation at a point in time when a lane change operation of a vehicle is started, and at a point in time when a lane change operation of a vehicle ends, according to another form of the present disclosure.

Referring to FIG. 2, the lane change controlling apparatus 100 may determine whether the lane change operation is started, by using a lateral distance DisToTire between a vehicle 10 and a lane, when the vehicle 10 crosses the left lane to perform the lane change. That is, the lateral distance DisToTire between the vehicle 10 and the lane may be a lateral distance between the left-side tire of the vehicle 10 and the lane; and the lateral distance DisToTire between the vehicle 10 and the lane may be represented by the following Equation 3.

$$DisToTire = D1 - D2 \qquad \text{[Equation 3]}$$

D1 is a distance from the center of the vehicle to a lane, and D2 indicates the vehicle's overall width/2.

At this time, D1 may be obtained through the sensing module 200, and D2 may be stored in advance. It is possible to determine that a point in time when the sign of the lateral distance DisToTire between the vehicle 10 and the lane is inverted is the start of the changing operation.

Referring to '301' of FIG. 3, all the tires of the vehicle 10 are placed within a returning area corresponding to original lane return 303. However, the lane change controlling apparatus 100 determines that the lane change operation is started, based on a state where the vehicle 10 is adjacent to a return reference line 11 (lane) and the sign of the lateral distance DisToTire between the vehicle 10 and the lane is inverted.

Referring to '302' of FIG. 3, an example in which the lane change operation is terminated is illustrated as the case where the vehicle 10 crosses the return reference line 11 (lane) and all the tires of the vehicle 10 are out of the area corresponding to original lane return 303.

Figure 4:
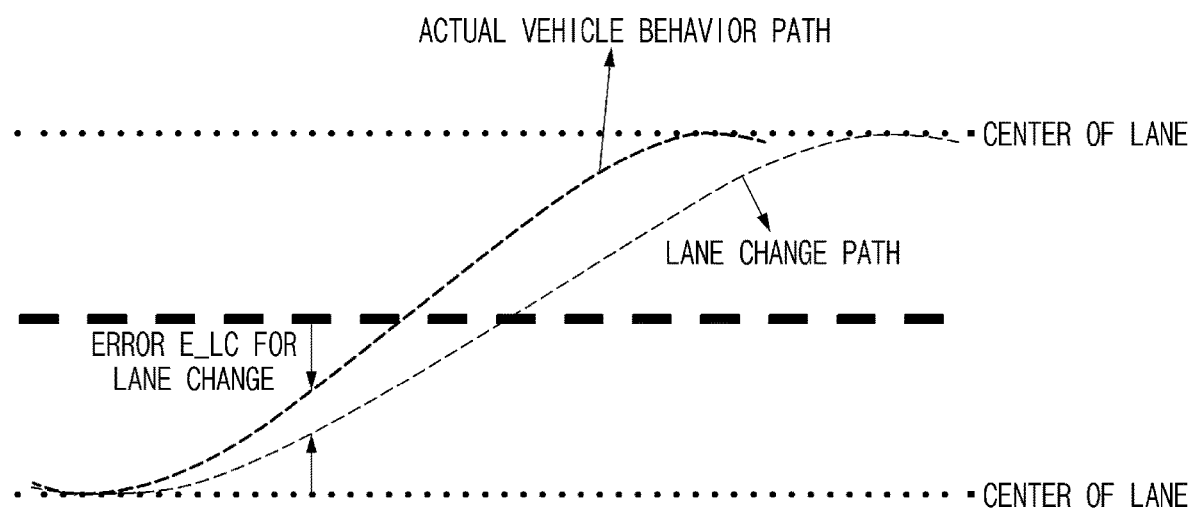
FIG. 4 is a view for describing an operation of determining whether a vehicle leans.
Figure 5:
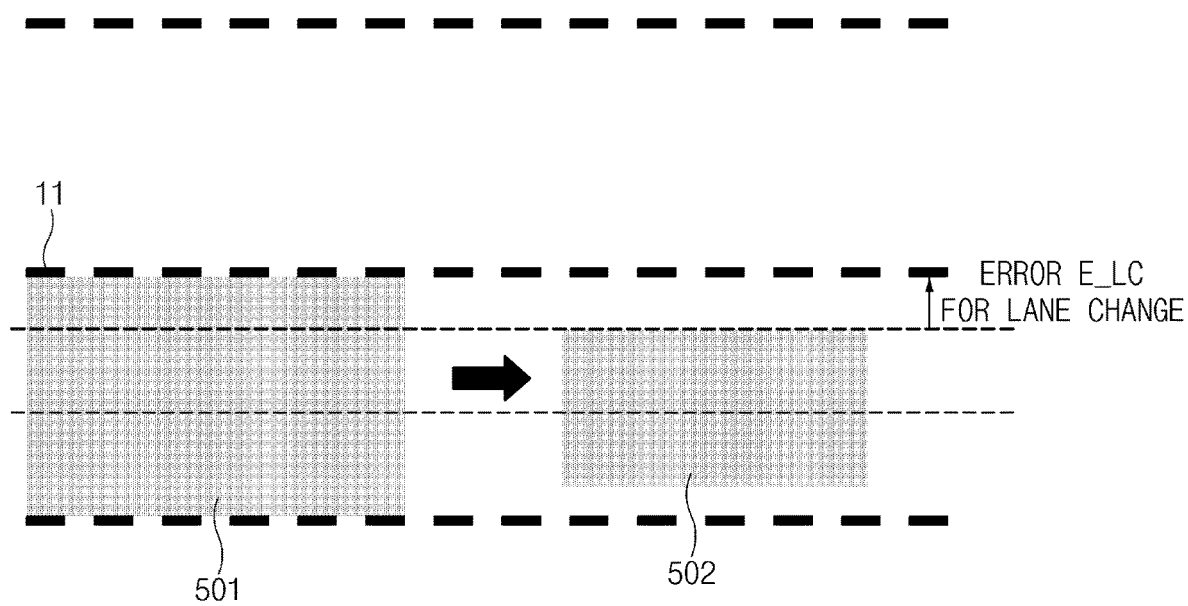
FIG. 5 is a view illustrating an example of reducing an area corresponding to lane return according to determination of leaning of a vehicle.

FIG. 4 is a view for describing an operation of determining whether a vehicle leans, in one form of the present disclosure. FIG. 5 is a view illustrating an example of reducing an area corresponding to lane return according to determination of leaning of a vehicle, according to another form of the present disclosure.

Referring to FIG. 4, the lane change controlling apparatus 100 may determine that a lane change behavior is fast, to reduce an area corresponding to original lane return LCA Zone for returning to an original lane, thereby inhibiting or preventing lane departure while returning, when a lateral location error for a lane change path is not less than an arbitrary value TBD (30 cm) in a lane change direction and the tilt occurs continuously during a specific time in a state where there is no intervention of a user (a driver) (when MDPS column torque is not greater than a reference value).

Referring to FIG. 5, the lane change controlling apparatus 100 may calculate an error E_LC for the lane change to reduce an area corresponding to original lane return 501 by the error E_LC for the lane change, when a vehicle leans; it is understood that the final area corresponding to original lane return 502 is reduced.

Figure 6:
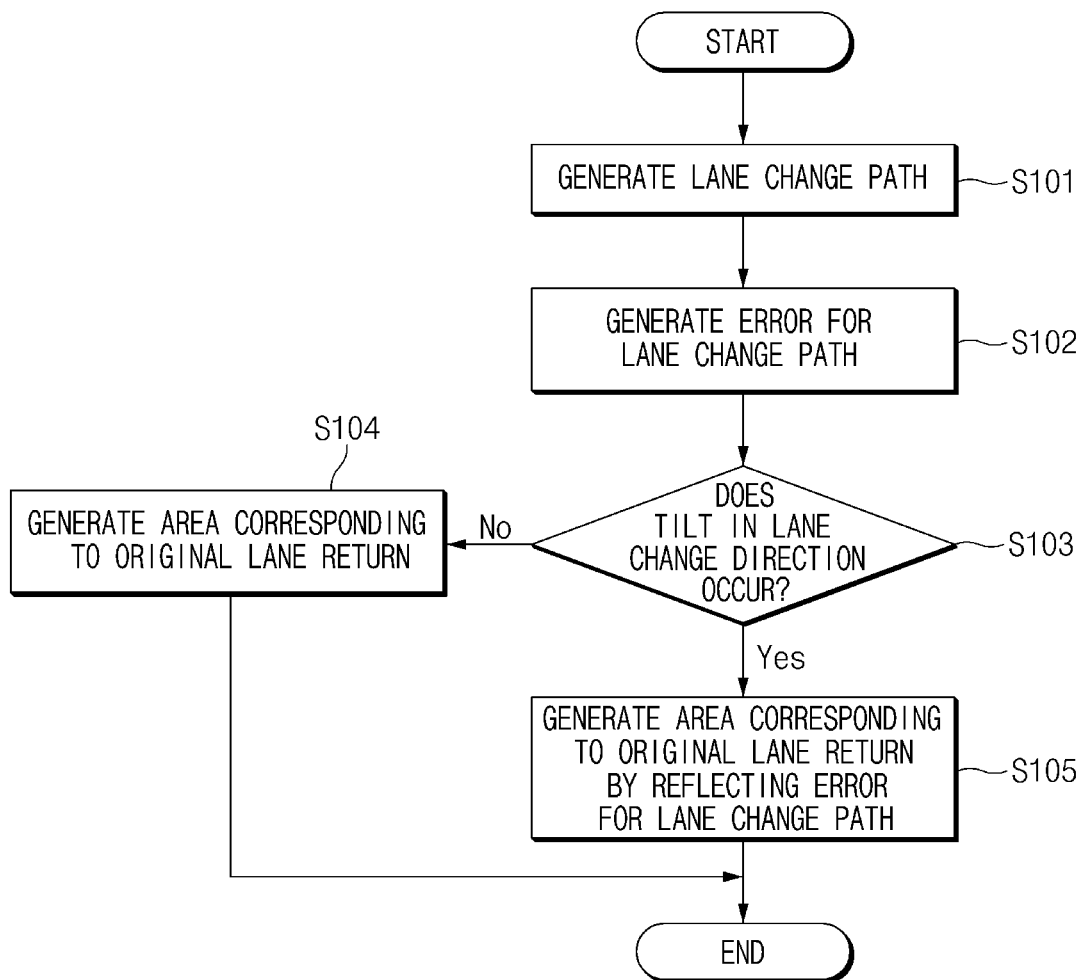
FIG. 6 is a flowchart for describing a method of generating an area corresponding to lane return.

Hereinafter, in one form of the present disclosure, a method of generating an area corresponding to lane return will be described with reference to FIG. 6. FIG. 6 is a flowchart for describing a method of generating an area corresponding to lane return, in another form of the present disclosure.

Hereinafter, it is assumed that the lane change controlling apparatus 100 of FIG. 1 performs the process of FIG. 6. In addition, in a description of FIG. 6, it may be understood that an operation described as being performed by a device is controlled by the processor 140 of the device 100.

Referring to FIG. 6, in operation S101, the lane change controlling apparatus 100 may generate a lane change path for the lane change, when a turn signal for the lane change is turned on by a user.

In operation S102, the lane change controlling apparatus 100 may generate an error for the lane change; and in operation S103, the lane change controlling apparatus 100 may determine whether the tilt in a lane change direction occurs. At this time, as illustrated in FIG. 4, the lane change controlling apparatus 100 may compare a lane change path with an actual vehicle behavior path, may generate the error E_LC for the lane change that is a lateral difference value between the lane change path and the actual vehicle behavior path, and may determine that the tilt in the lane change direction occurs, when the error for the lane change is not less than a predetermined reference value (e.g., 30 cm).

In operation S104, the lane change controlling apparatus 100 may generate the area corresponding to original lane return based on the left and right lanes of the current driving lane and the overall length of the vehicle, when the tilt in the lane change direction does not occur, that is, when the error for the lane change is less than the predetermined reference value. As illustrated in FIG. 2, the area corresponding to original lane return may be generated by calculating the lateral distance DisToTire between the vehicle 10 and the lane; as described in Equation 3, the lateral distance DisToTire between the vehicle 10 and the lane is a lateral distance between the left-side tire of the vehicle 10 and the lane. As illustrated in '501' of FIG. 5, the lane change controlling apparatus 100 may generate the entire lateral area (from left-side lane to right-side lane) of a lane, as the area corresponding to original lane return.

In the meantime, in operation 105, the lane change controlling apparatus 100 may subtracts the error for the lane change from the lateral distance DisToTire between the vehicle 10 and the lane to reduce the lateral distance DisToTire between the vehicle 10 and the lane, when the tilt in the lane change direction occurs, that is, when the error for the lane change is not less than the predetermined reference value As illustrated in '502' of FIG. 5, it is understood that the lateral distance DisToTire between the vehicle 10 and the lane is reduced as compared with '501'.

As such, the lane change controlling apparatus 100 may generate and store the area corresponding to original lane return according to the tilt in the lane change direction, when the lane change path is generated while the vehicle is driving; the lane change controlling apparatus 100 may use the area corresponding to original lane return, when the lane change procedure is interrupted or when determining whether to return to an original lane, in FIG. 7 later.

As such, the lane change controlling apparatus 100 may reduce the area corresponding to original lane return when the tilt in the lane change direction occurs, thereby inhibiting or preventing lane departure, or the like when the vehicle returns to an original lane.

Figure 7:
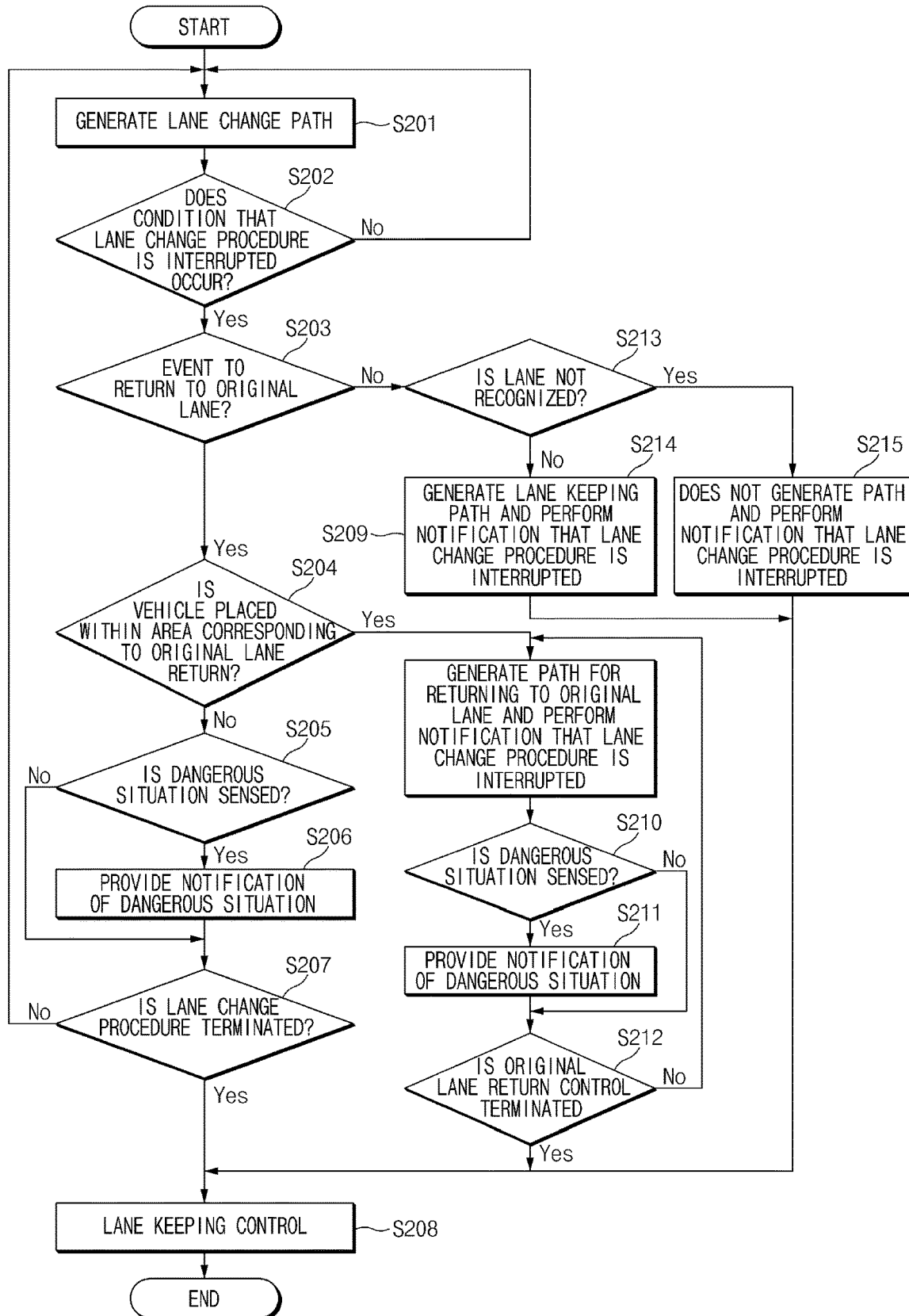
FIG. 7 is a flowchart for describing a method for controlling lane change of a vehicle.

FIG. 7 is a flowchart for describing a method for controlling lane change of a vehicle, according to an exemplary form of the present disclosure.

Hereinafter, it is assumed that the lane change controlling apparatus 100 of FIG. 1 performs the process of FIG. 7. In addition, in a description of FIG. 7, it may be understood that an operation described as being performed by a device is controlled by the processor 140 of the device 100.

In operation S201, the lane change controlling apparatus 100 may generate a lane change path for the lane change, when a turn signal for the lane change is turned on by a user.

In operation S202, the lane change controlling apparatus 100 may determine whether a condition that a lane change procedure is interrupted occurs, while a vehicle is driving along on a lane change path. At this time, the condition that the lane change procedure is interrupted may include 1) when a dangerous situation is sensed, 2) when hand-off is sensed, 3) in the case of cancellation (the case where a user turns off a turn signal) by a user, 4) when a lane change operation is not started within a predetermined time (e.g., 5 seconds) after the user manipulates a turn signal, 5) when a lane change function is turned off or overridden by the user, 6) when the limit of a system is reached (the case where a lane is not recognized, or the like), 7) when an operation of approaching a lane and lateral movement for completing the lane change operation are not continuous during the lane change procedure, or the like.

Next, in operation S203, the lane change controlling apparatus 100 may determine whether the condition corresponds to an event to return to an original lane, when the condition that the lane change procedure is interrupted occurs. At this time, the event to return to an original lane may correspond to 1) the case where the dangerous situation is sensed, 2) the case where the hand-off is sensed, 3) the case of the cancellation (the case where a user turns off a turn signal) by a user, or 4) the case where the lane change operation is not started within a predetermined time (e.g., 5 seconds) after the user manipulates the turn signal.

In operation S204, the lane change controlling apparatus 100 may determine whether the vehicle is placed within an area corresponding to original lane return, when the case corresponds to the event to return to an original lane. At this time, the lane change controlling apparatus 100 may recognize a lane from camera image information or information obtained by a sensor such as radar, LiDAR, or the like and may determine whether the vehicle is placed within the area corresponding to original lane return, by using GPS information or the like received from the GPS receiver 300.

The lane change controlling apparatus 100 may determine whether it is not possible to return to an original lane, when the vehicle is not placed within the area corresponding to original lane return, or when the probability that the vehicle will cross the lane is great based on the behavior of the vehicle; in operation S205, the lane change controlling apparatus 100 may sense whether the current situation is a dangerous situation, during the lane change; in operation S206 may perform a dangerous situation notification, when the current situation is the dangerous situation. At this time, the lane change controlling apparatus 100 may determine the dangerous situation during the lane change in consideration of whether the vehicle collides with a nearby vehicle; the lane change controlling apparatus 100 may perform the visual, auditory, and tactile dangerous situation notification.

Afterward, in operation S207, the lane change controlling apparatus 100 may maintain a lane change path to perform lane change control and may determine whether the lane change procedure is completed. In operation S208, the lane change controlling apparatus 100 performs lane keeping control on the changed current lane, when the lane change procedure is completed.

In operation S209, the lane change controlling apparatus 100 determines that it is possible to return to an original lane, generates a path for returning to an original lane, and performs a notification that the lane change procedure is interrupted, when the vehicle is placed within the area corresponding to original lane return in operation S204.

Afterward, in operation S210, the lane change controlling apparatus 100 senses whether the current situation is the dangerous situation, when returning to the original lane; in operation S211, the lane change controlling apparatus 100 performs the dangerous situation notification, in the case of the dangerous situation.

In operation S212, the lane change controlling apparatus 100 may control the vehicle to return to the original lane depending on the generated path for returning to an original lane and may determine whether original lane return control is terminated. In operation S208, the lane change controlling apparatus 100 performs lane keeping control on the changed current lane (original lane), when the original lane return control is completed.

In the meantime, in operation S213, the lane change controlling apparatus 100 determines whether a lane is not recognized, when the event to return to an original lane does not occur in operation S203, that is, 5) when a lane change function is turned off or overridden by a user, 6) when the limit of a system is reached (the case where a lane is not recognized, or the like), 7) when an operation of approaching a lane and lateral movement for completing the lane change operation are not continuous during the lane change procedure, among the conditions that a lane change procedure is interrupted.

In operation S214, the lane change controlling apparatus 100 generates a lane recognition-based lane keeping path and performs a notification that the lane change is interrupted, when the lane is recognized. That is, since it is possible to recognize a lane, 5) when a lane change function is turned off or overridden by a user, and 7) when an operation of approaching a lane and lateral movement for completing the lane change operation are not continuous during the lane change procedure, among the conditions that a lane change procedure is interrupted, the lane change controlling apparatus 100 generates a lane keeping path, allows the current lane to be maintained, and interrupts the lane change.

On the other hand, since it is impossible to generate a lane keeping path when a lane is not recognized, in operation S215, the lane change controlling apparatus 100 performs a notification that the lane change procedure is interrupted, without generating a path. At this time, the lane change controlling apparatus 100 may transfer the control of the lateral movement to the user and may allow the user to directly perform the control of the lateral movement. At this time, the notification that the lane change procedure is interrupted may be performed with visual, auditory, or tactile sense.

As such, the present disclosure may determine the condition that a lane change procedure is interrupted and an event to return to an original lane during the lane change procedure and may perform control such as lane change keeping, the interruption of the lane change procedure, the control of original lane return, current lane keeping, or the like, thereby providing a user with the minimum sense of difference and improving the usability of the lane change assist function.

Figure 8:
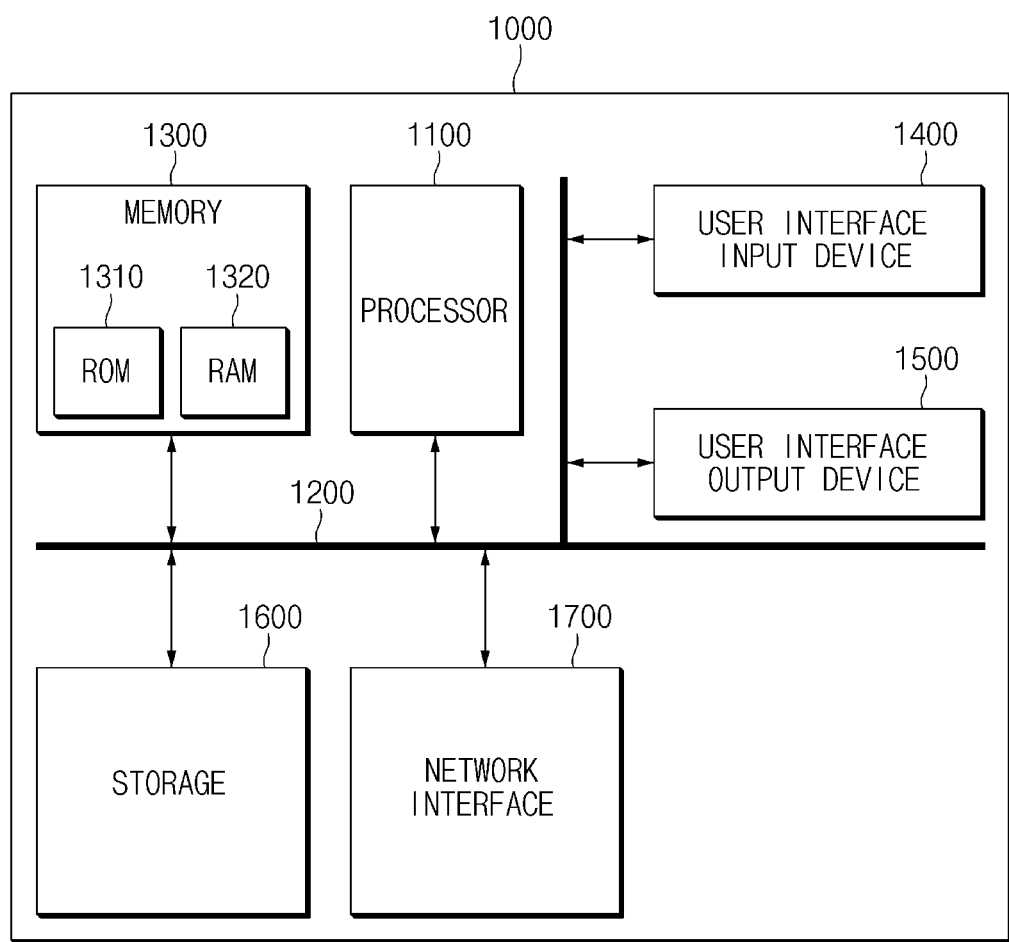
FIG. 8 a block diagram illustrating a computing system.

FIG. 8 illustrates a computing system according to an exemplary form of the present disclosure.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Thus, the operations of the methods or algorithms described in connection with the forms disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may reside in a user terminal. Alternatively, the processor and storage medium may be implemented with separate components in the user terminal.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

Therefore, forms of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

The present disclosure may perform lane change control and lane change cancellation control for minimizing the sense of difference of a user, thereby improving the usability of the lane change assist function.

Besides, a variety of effects directly or indirectly understood through this disclosure may be provided.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. An apparatus for controlling a lane change of a vehicle, the apparatus comprising:
a processor configured to:
determine whether a condition of interrupting a lane change procedure occurs, during controlling the lane change, and
when the condition of interrupting the lane change procedure occurs, determine whether to interrupt the lane change procedure, or whether to return the vehicle to an original lane; and
a storage configured to store outputs determined by the processor,
wherein the condition of interrupting the lane change procedure comprises:
when a dangerous situation is sensed;
when a hand-off state of a user of the vehicle is sensed;
when a request to cancel the lane change procedure is generated by the user;
when a lane change operation is not started within a predetermined time after the user requests the lane change;
when a lane change function is turned off or overridden by the user; and
when an operation of approaching a lane and a lateral movement for completing the lane change operation are not continuous while a lane is not recognized or during the lane change procedure.

2. The apparatus of claim 1, wherein the processor is configured to:
calculate a lane change path, when receiving a lane change request; and
determine whether the vehicle leans toward a target lane in a lane change direction.

3. The apparatus of claim 2, wherein the processor is configured to:
calculate a difference value between the lane change path and an actual vehicle behavior path based on an error in the lane change.

4. The apparatus of claim 3, wherein the processor is configured to:
determine that the vehicle does not lean, when the error in the lane change is less than a predetermined reference value; and
calculate a returning area to return the vehicle to the original lane based on a distance from a center of the vehicle to a lane mark of a current lane on which the vehicle is travelling, and a value corresponding to a half of an overall width of the vehicle.

5. The apparatus of claim 4, wherein the processor is configured to:
determine that the vehicle leans toward the target lane, when the error in the lane change is equal to or greater than the predetermined reference value.

6. The apparatus of claim 5, wherein the processor is configured to:
reduce the calculated returning area when it is determined that the vehicle leans toward the target lane.

7. The apparatus of claim 6, wherein the processor is configured to:
reduce the calculated returning area corresponding to the error in the lane change.

8. The apparatus of claim 1, wherein the processor is configured to:
determine whether an event to return the vehicle to the original lane occurs, when the condition of interrupting the lane change procedure occurs.

9. The apparatus of claim 8, wherein the processor is configured to:
determine that the event to return the vehicle to the original lane occurs, when at least one of following cases occurs:
a case that a lane change function is turned off or overridden by a user, a case that an operation of approaching a lane and a lateral movement for completing the lane change operation are not continuous while a lane is not recognized or during the lane change procedure.

10. The apparatus of claim 8, wherein the processor is configured to:
determine whether the vehicle is placed within a returning area corresponding to an area to return the vehicle to the original lane, when the event to return to the original lane occurs.

11. The apparatus of claim 10, wherein the processor is configured to:
when the vehicle is placed within the returning area,
calculate a path for returning the vehicle to the original lane; and
provide a notification that the lane change procedure is interrupted.

12. The apparatus of claim 11, wherein the processor is configured to:
keep a lane change path continuously, when the vehicle is not placed within the returning area.

13. The apparatus of claim 8, wherein the processor is configured to:
determine whether a lane is not recognized, when the event to return to the original lane does not occur.

14. The apparatus of claim 13, wherein the processor is configured to:
when the lane is recognized,
calculate a path for keeping a current lane; and
provide a notification that the lane change procedure is interrupted.

15. The apparatus of claim 13, wherein the processor is configured to:
provide a notification that the lane change procedure is interrupted, without calculating a lane change path, when the lane is not recognized.

16. The apparatus of claim 1, wherein the processor is configured to:
sense a dangerous situation, when a relative longitudinal distance of a nearby vehicle is less than a predetermined safe reference with respect to the vehicle; and
determine a hand-off state of a user when a steering torque or a steering torque change rate are equal to or less than predetermined corresponding reference values, respectively.

17. A vehicle system for a vehicle, comprising:
a lane change controlling apparatus configured to:
determine whether a condition of interrupting a lane change procedure occurs, during controlling the lane change, and when the condition of interrupting the lane change procedure occurs, determine whether to interrupt the lane change procedure, or whether to return the vehicle to an original lane; and a warning device configured to output a notification when the lane change procedure is interrupted, wherein the condition of interrupting the lane change procedure comprises:

when a dangerous situation is sensed;

when a hand-off state of a user of the vehicle is sensed;

when a request to cancel the lane change procedure is generated by the user;

when a lane change operation is not started within a predetermined time after the user requests the lane change;

when a lane change function is turned off or overridden by the user; and when an operation of approaching a lane and a lateral movement for completing the lane change operation are not continuous while a lane is not recognized or during the lane change procedure.

18. A method for controlling a lane change of a vehicle, the method comprising:

determining, by a processor, whether a condition of interrupting a lane change procedure occurs, during controlling the lane change;

when the condition of interrupting the lane change procedure occurs, determining, by the processor, whether to interrupt the lane change procedure, or whether to return the vehicle to an original lane to control the vehicle; and outputting, by a warning device, a notification when the lane change procedure is interrupted, wherein the condition of interrupting the lane change procedure comprises:

when a dangerous situation is sensed;

when a hand-off state of a user of the vehicle is sensed;

when a request to cancel the lane change procedure is generated by the user;

when a lane change operation is not started within a predetermined time after the user requests the lane change;

when a lane change function is turned off or overridden by the user; and when an operation of approaching a lane and a lateral movement for completing the lane change operation are not continuous while a lane is not recognized or during the lane change procedure.

\* \* \* \* \*